United States Patent Office 2,933,846
Patented Apr. 26, 1960

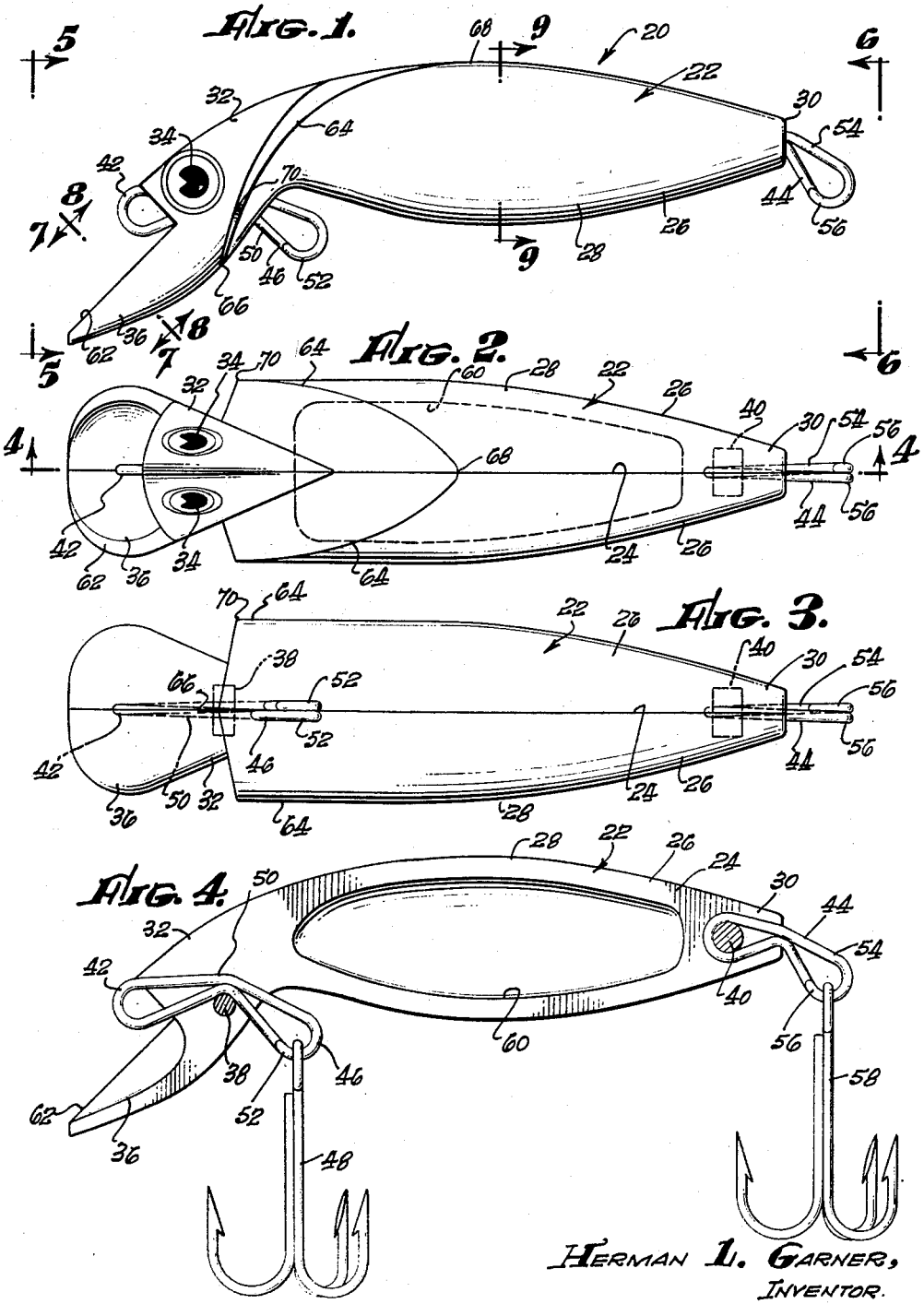

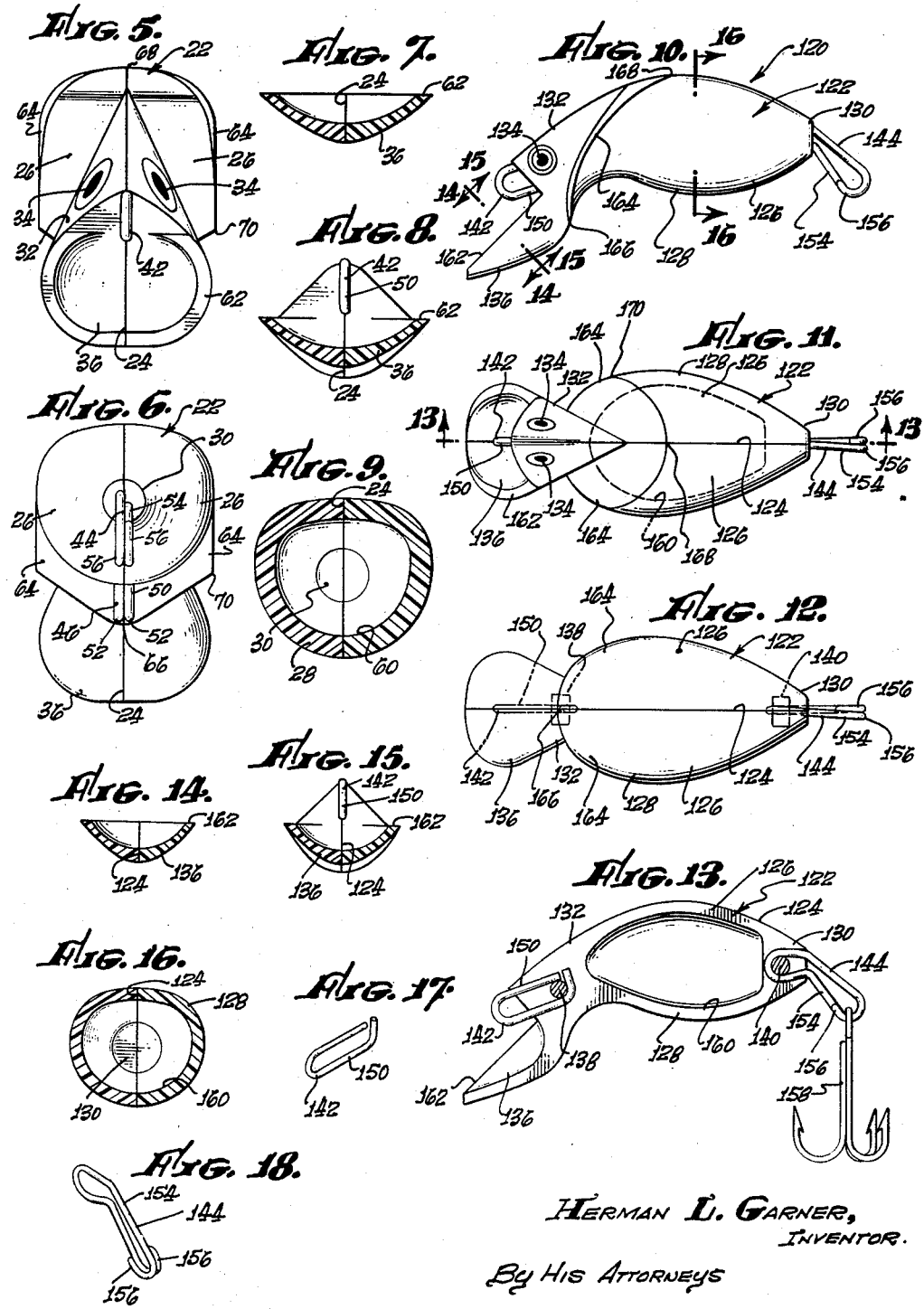

2,933,846

FISH LURE

Herman L. Garner, Los Angeles, Calif.

Application May 7, 1957, Serial No. 657,630

9 Claims. (Cl. 43—42.35)

The present invention relates to fish lures and a general object thereof is to provide a fish lure having hydrodynamic characteristics and buoyancy characteristics so related as to provide the lure with an extremely life-like and spirited swimming and diving action, even at low lure speeds relative to the water, higher lure speeds increasing the depth to which the lure dives and increasing the swimming action. In accordance with the invention, the buoyancy characteristics of the lure may be varied to vary the depth to which the lure will descend in the water, which is another general object.

Considering the invention more specifically, it contemplates a lure which includes a hollow lure member having a body provided with forward and rearward ends, a downwardly and forwardly extending head on the forward end of the body and a downwardly and forwardly extending spoon on the head for producing lateral oscillatory movement of the lure, the entire lure being so balanced that the body of the lure member is generally horizontal when the lure is quiescent in the water. A hook hanger is attached to the rearward end of the body of the lure member, i.e., to the tail of the lure member, and projects rearwardly therefrom to carry a hook, and a leader eye is attached to the head of the lure member and projects forwardly therefrom above the spoon, this leader eye, in one embodiment of the invention, incorporating a forward hook hanger which projects downwardly and rearwardly from the head of the lure member to carry a forward hook.

An important object of the invention is to provide a lure of the foregoing nature wherein the lure member includes two dive planes respectively extending laterally in opposite directions from the head and the body and curving upwardly and rearwardly from a forward position on the lower surface of the lure member adjacent the junction of the spoon and the head to a rearward position on the upper surface of the lure member rearwardly of the junction of the head and the body, the dive planes being upwardly and forwardly convex planes which converge downwardly and forwardly to a point at the forward position mentioned and which converge upwardly and rearwardly to a point at the rearward position described. With this construction, the water impinging on the convex upper or forward surfaces of the dive planes produces a diving action which can carry the lure to great depths.

Another object of the invention is to provide the spoon with a lip lying in a plane which makes an angle of substantially 45° with, and which is perpendicular to a vertical plane containing, the axis of the body of the lure member, and to locate the spoon entirely below the body of the lure member. With this construction, the spoon, being pendant relative to the lure body, is provided with maximum leverage to cause the spoon to make the fish lure oscillate with maximum effectiveness, which is an important feature.

Another object is to provide the spoon with a lip which is substantially circular, as viewed from above and forwardly of the plane of the lip of the spoon, and to locate the forward end of the leader eye just above and forwardly of the plane of the lip of the spoon and substantially on the axis of such lip, which results in locating the forward end of the leader eye slightly forwardly of and above the lower, forward end of the convergent dive planes. This eye location enhances the effectiveness of the dive planes in producing the desired diving action for the lure. In other words, the low fulcrum position resulting from locating the leader eye close to the forward, lower end of the convergent dive planes in this manner causes the lure to be pulled under the water impinging on the dive planes with maximum effectiveness.

Another object of considerable importance is to provide a lure member which is symmetrical relative to a vertical plane and which comprises two symmetrical halves joined together in such vertical plane. Another object in this connection is to provide forward and rearward transverse dowels or pins extending through the vertical dividing plane of the lure member into the two halves thereof at the head and the tail of the lure member, respectively, the hook hanger at the tail of the lure member being clamped between the halves of the lure member and being connected to the rearward pin, and the leader eye being clamped between the two halves of the lure member and being connected to the forward pin. Still another object in this connection is to provide a hook hanger and a leader eye in the form of split loops respectively looped around, i.e., bent around, the rearward and forward pins.

An important feature of the present invention is that the foregoing lure-member construction results in a lure member having a minimum of solid material, it being necessary that the lure member be solid only in the vicinities of the two transverse pins which extend into the two halves of the lure member. Thus, virtually the entire body of the lure member, and even a portion of the head thereof, may be hollow to provide the lure member with maximum buoyancy, it being understood that the buoyancy of the lure may be varied by varying the volume of the hollow portion of the lure member, or by varying the weights of various components of the lure, such as the hook or hooks thereon, to achieve the desired over-all buoyancy, depending upon whether the lure is intended to operate at or near the surface of the water, or below the surface thereof. The buoyancy control resulting from forming the lure member in two symmetrical halves joined in a vertical plane plays an important role in the swimming and diving action produced by the cooperation between the spoon and the dive planes, which is an important feature. In other words, the split lure-member construction discussed above permits the attainment of an overall buoyancy such as to make the most of the interaction of the spoon and the dive planes, which is an important feature.

The foregoing objects, advantages, features and results of the present invention, together with various other objects, advantages, features and results thereof which will be apparent to those skilled in the art in the light of this disclosure, may be attained with the exemplary embodiments of the invention described in detail hereinafter and illustrated in the accompanying drawings, in which:

Fig. 1 is a side elevational view of a fish lure which embodies the invention, the lure being shown without hooks in this view for convenience;

Fig. 2 is a top plan view of the fish lure of Fig. 1;

Fig. 3 is a bottom plan view of the fish lure of Fig. 1;

Fig. 4 is a longitudinal sectional view taken along the arrowed line 4—4 of Fig. 2, hooks being shown in Fig. 4;

Figs. 5 and 6 are respectively front end and rear end elevational views of the fish lure of Fig. 1 and are taken as indicated by the arrowed lines 5—5 and 6—6, respectively;

Figs. 7, 8 and 9 are transverse sectional views respectively taken along the arrowed lines 7—7, 8—8 and 9—9 of Fig. 1;

Fig. 10 is a side elevational view of another fish lure embodying the invention, no hook being shown in Fig. 10 for convenience;

Figs. 11 and 12 are top plan and bottom plan views, respectively, of the fish lure of Fig. 10;

Fig. 13 is a longitudinal sectional view taken along the arrowed line 13—13 of Fig. 11, a hook being shown in Fig. 13;

Figs. 14, 15 and 16 are transverse sectional views respectively taken along the arrowed lines 14—14, 15—15 and 16—16 of Fig. 10;

Fig. 17 is an isometric view of a leader eye incorporated in the embodiment of Fig. 10; and Fig. 18 is an isometric view of a hook hanger incorporated in the embodiment of Fig. 10.

Considering first the embodiment of Figs. 1 to 9 of the drawings, this embodiment is designated generally by the numeral 20 and includes a lure member 22 symmetrical relative to a vertical bisecting plane 24 and formed in two halves 26 joined in the plane 24. The lure member 22 may be formed of any suitable material, such as one of the so-called plastics, and the two halves 26 thereof may be secured together in the vertical plane 24 in any suitable manner, as by cementing or coalescing, for example, to provide a water-tight structure.

The lure member 22 includes an elongated body 28 having a rearward end or tail 30 and having at its forward end a downwardly and forwardly extending or sloping and rearwardly tapering head 32, which may be provided on opposite sides of the upper surface thereof with eyes 34 to simulate a minnow, or the like. At the forward end of the head 32 is a downwardly and forwardly extending spoon 36.

The lure 20 includes forward and rearward pins 38 and 40, respectively located in the head 32 and the tail 30 of the lure member 22, which extend through the vertical plane 24 into the two halves 26 of the lure member, these pins being secured in place in any suitable manner, as by cementing them to the halves 26. Clamped between the two halves 26 of the lure member 22 and respectively connected to the forward and rearward pins 38 and 40 are a leader eye 42 and a rearward hook hanger 44, the two halves of the lure member being suitably recessed to receive the leader eye 42 and the rearward hook hanger 44 therebetween. The leader eye 42 projects generally forwardly from the head 32 and terminates forwardly of the head and above the spoon 36, the precise location of the leader eye relative to the spoon being discussed in more detail hereinafter. In the fish lure 20 under consideration, the leader eye 42 is formed integrally with a forward hook hanger 46 which projects downwardly and rearwardly from the under side of the head 32 and which is located below the forward end of the body 28, this hook hanger carrying a forward hook 48. The leader eye 42 and the forward hook hanger 46 are formed by a single, split loop 50 which is looped, i.e., bent, around the forward pin 38 to anchor the loop in place, this loop having overlapping ends 52 which form the hook hanger 46.

Similarly, the rearward hook hanger 44 comprises a single, split loop 54 which is looped around the rearward pin 40, the loop 54 projecting downwardly and rearwardly from the tail 30 of the body 28 and having overlapping ends 56 which support a rear hook 58. It will be understood that the spacing between the forward and rearward hook hangers 46 and 44 and the dimensions of the forward and rearward hooks 48 and 58 are so related that interentanglement of the hooks is prevented.

An important feature of the present invention is that the foregoing means of attachment of the leader eye 42 and the hook hangers 44 and 46 to the lure member 22 requires providing the lure member with solid portions in the vicinities of the pins 38 and 40 only. In other words, this means of mounting the leader eye 42 and the hook hangers 44 and 46 on the lure member 22 permits making substantially the entire lure member hollow to provide within the lure member a large air chamber 60, such air chamber providing the lure 20 with a degree of buoyancy sufficient to permit utilizing the hereinafter described hydrodynamic characteristics of the lure with maximum effectiveness. In the particular construction illustrated, the air chamber 60 is shown as extending substantially from the tail 30 of the lure member 22 to the head 32 thereof, although it will be understood that the volume of the air chamber may be increased or decreased to increase or decrease the buoyancy of the lure 20. For example, if an increased lure buoyancy is desired, the air chamber 60 may be extended forwardly into the head 32 and substantially to the forward pin 38.

Considering now the hydrodynamic characteristics of the lure member 22, the body 28 has a cross-sectional configuration which may best be described as a circle somewhat flattened on top, as best shown in Fig. 9. The body 28 converges rearwardly to the tail 30 when viewed in plan and side elevation, as will be apparent from Figs. 2, 3 and 4 of the drawings, this convergence occurring between approximately the mid-point of the body and the tail. From its mid-point forwardly the body 28 is of substantially uniform width when viewed in plan, as will be apparent from Figs. 2 and 3, but the body converges forwardly from substantially its mid-point to the head 32 when viewed in side elevation, as will be apparent from Fig. 4.

The lower portion of the forward end of the head 32 of the lure member 22 terminates below the body 28 of the lure member and the rearward end of the spoon 36 is integrally joined to such portion of the forward end of the head 32 so that the spoon is entirely below the body 28. The spoon 36 is provided with a lip 62 lying in a plane which makes an angle of substantially 45° with a horizontal plane containing the longitudinal axis of the body 28 of the lure member 22, the plane of the spoon lip 62 sloping downwardly and forwardly. The lip 62 is substantially circular as viewed from above and forwardly of the plane thereof, the lip 62 appearing elliptical in Fig. 2 of the drawing since it is viewed from a point directly above the lure 20 as a whole in this figure. The leader eye 42 is located forwardly of the junction of the head 32 and the spoon 36 and the forward extremity of the leader eye is located above and forwardly of the plane of the lip 62 at a point on the axis of the circle defined by such lip. Thus, the rearward end of a leader, or leader link, not shown, attached to the leader eye 42 is located above the plane of the lip 62 and substantially on the axis of the circle defined by such lip, at a distance above the bottom of the spoon substantially equal to one-half the inside diameter of the circle defined by the lip. This location of the leader eye relative to the spoon 36 represents substantially the lowest fulcrum point which can be utilized to enable the spoon to develop maximum oscillation of the lure.

Considering another important hydrodynamic characteristic of the lure member 22, the lure member is provided on opposite sides thereof with dive planes 64 which extend laterally in opposite directions from the rearwardly tapering head 32 and the body 28 of the lure member. These dive planes, which are arcuate, upwardly and forwardly convex, hydrofoil sections, extend upwardly and rearwardly from a forward position 66 on the lower surface of the lure member 22 adjacent the junction of the head 32 and the spoon 36 to a rearward position 68 on the upper surface of the lure member rearwardly of the junction of the body 28 and the head 32. The dive planes 64 have their maximum span at an intermediate position 70 adjacent the forward position 66, the dive planes 64 converging forwardly and downwardly from the intermediate position 70 to a point at the forward position 66, and converging upwardly and rearwardly from the intermediate position 70 to a point at the rearward position 68.

As will be apparent, with the dive planes 64 disclosed, the water impinging on the upper or forward surfaces of the dive planes applies downward force components to the lure 20, thereby causing the lure to dive. It should be noted that the low fulcrum point provided by locating the leader eye 42 just forwardly of and just above the point of convergence 66 of the dive planes 64 obtains maximum effectiveness from the dive planes and also causes the spoon 36 to produce maximum oscillation.

Of considerable importance is the fact that the head 32 tapers rearwardly as shown in Fig. 2, which increases the dive plane area and effectiveness and which lessens the resistance to lateral oscillation produced by the head. Also important is the fact that the leader eye 42 is in front of the head 32, which, combined with the pendant spoon position, produces maximum lateral oscillation at maximum frequency.

Considering the operation of the fish lure 20, the location of the air chamber 60 is so related to the weights of the various components of the lure that, under quiescent conditions, the lure floats with the body 28 thereof substantially horizontal, as shown in the drawings. The volume of the air chamber 60 may be so related to the weights of the various components of the lure 20 that the lure floats at or near the surface with just the uppermost portion of the body 28 above water. With such a degree of buoyancy, the lure 20 operates at or just below the water surface. However, the volume of the air chamber 60 may be so related to the weights of the various components of the lure that the lure is submerged, under quiescent conditions, at any desired level below the surface. The lure 20 may readily be converted from one which floats at or near the surface to one which floats below the surface by substituting hooks one size larger for the hooks 48 and 58, which is a feature of the invention.

When relative movement between the lure 20 and the water occurs, due either to water flow past the lure in a stream, or due to movement of the lure produced by pulling on a leader attached to the leader eye 42, the impingement of the water on the spoon 36 and the subsequent impingement of the water deflected upwardly by the spoon on the dive planes 64 causes the lure to move relative to the water with a very spirited and life-like swimming and dividing action, the amplitude of the motion of the lure increasing as the water velocity relative to the lure increases. The water impinging on the spoon 36 causes the spoon to oscillate from side to side, the hereinbefore-described hydrodynamic characteristics of the lure member 22 causing the side-to-side motion of the spoon to produce pivotal movement of the entire lure 20 about an axis forward of the mid-point of the lure. Consequently, the posterior extremity of the lure 20 swings from side to side through a greater arc than does the anterior extremity thereof. The resulting swimming action is quite pronounced and extremely life-like and occurs at a higher frequency than prior lures.

The cooperation between the spoon 36 and the dive planes 64 also causes the lure 20 to dive in addition to the side-to-side swimming action discussed above. The extent to which the lure 20 dives depends upon the velocity of the water relative to the lure, as does the swimming action discussed. Thus, the swimming action and the extent to which the lure 20 dives may be controlled by controlling the speed of the lure relative to the water in a manner which will be apparent.

Turning now to Figs. 10 to 18 of the drawings, the embodiment illustrated therein is a smaller-size fish lure which is designated generally by a numeral larger by 100 than the numeral used to generally designate a fish lure of Figs. 1 to 9, i.e., which is designated generally by the numeral 120. Similarly, the various components of the lure 120 are designated by numerals larger by 100 than the numerals utilized to designate the corresponding components of the lure 20. The lure 120 is substantially identical to the lure 20 in most respects, so that it will be necessary to consider hereinafter only the differences therebetween.

One difference between the lure 120 and the lure 20 is that the body 128 of the lure member 122 converges forwardly from its midpoint when viewed in plan, as well as rearwardly therefrom, it being recalled that the body 28 of the lure member 22 is of substantially uniform width forwardly of its mid-point when viewed in plan. Another difference is that the air chamber 160 of the lure 120 extends farther forward than the air chamber 60 of the lure 20, the air chamber 160 extending forwardly into the head 132 to provide the smaller lure member 122 with sufficient buoyancy to provide the lure 120 with the desired overall buoyancy when the various other components are attached to the lure member 122.

Another difference is that, being a small-size lure, the lure 120 includes only the rearward hook 158, there being no forward hook corresponding to the forward hook 48. Consequently, the leader eye 142 is formed by a split loop 150, looped around the forward pin 138, which is smaller than the loop 50 and which omits the downwardly and rearwardly extending portion thereof utilized to form the forward hook hanger 46.

The diving and swimming action of the lure 120 is very similar to that of the lure 20 so that a detailed description is unnecessary.

Although two exemplary embodiments of the invention have been disclosed herein for purposes of illustration, it will be understood that various changes, modifications and substitutions may be incorporated in such embodiments without departing from the spirit of the invention as defined by the following claims.

I claim:

1. In a fish lure member, the combination of: a body having forward and rearward ends; a head on the forward end of said body; a downwardly and forwardly extending spoon on said head; and two dive planes respectively extending laterally in opposite directions from said head and said body and extending upwardly and rearwardly from a forward position on the lower surface of the lure member adjacent the junction of said spoon and said head to a rearward position on the upper surface of the lure member rearwardly of the junction of said head and said body.

2. In a fish lure member, the combination of: a body having forward and rearward ends; a head on the forward end of said body; a downwardly and forwardly extending spoon on said head; and two dive plans respectively extending laterally in opposite directions from said head and said body and extending upwardly and rearwardly from a forward position on the lower surface of the lure member adjacent the junction of said spoon and said head to a rearward position on the upper surface of the lure member rearwardly of the junction of said head and said body, said dive planes converging forwardly and downwardly to a point at said forward position and converging upwardly and rearwardly to a point at said rearward position.

3. In a fish lure member, the combination of: a body having forward and rearward ends; a head on the forward end of said body; a downwardly and forwardly extending spoon on said head; and two dive planes respectively extending laterally in opposite directions from said head and said body and curving upwardly and rearwardly from a forward position on the lower surface of the lure member adjacent the junction of said spoon and said head to a rearward position on the upper surface of the lure member rearwardly of the junction of said head and said body, said dive planes converging forwardly and downwardly to a point at said forward position and converging upwardly and rearwardly to a point at said rearward position, and said dive planes being upwardly and forwardly convex.

4. In a fish lure member, the combination of: a body having a longitudinal axis and having forward and rearward ends; a downwardly and forwardly extending head on the forward end of said body; a downwardly and forwardly extending spoon on said head, said spoon having a lip lying in a plane making an angle of substantially 45° with a horizontal plane containing said axis; and two dive planes respectively extending laterally in opposite directions from said head and said body and curving upwardly and rearwardly from a forward position on the lower surface of the lure member adjacent the junction of said spoon and said head to a rearward position on the upper surface of the lure member rearwardly of the junction of said head and said body, said dive planes converging forwardly and downwardly to a point at said forward position and converging upwardly and rearwardly to a point at said rearward position.

5. In a fish lure, the combination of: a lure member as defined in claim 4, said lip of said spoon being substantially circular, as viewed from a point above and forwardly of said plane thereof; and a leader eye carried by said head and extending forwardly therefrom and terminating at a point above the center of said substantially circular lip of said spoon.

6. In a fish lure, the combination of: a lure member as set forth in claim 3, said lure member being hollow and symmetrical relative to a vertical plane and comprising two symmetrical halves joined together in said vertical plane; forward and rearward transverse pins extending through said vertical plane into said halves at said head and the rearward end of said body, respectively; a hook hanger disposed between said halves and projecting rearwardly from the rearward end of said body, said hook hanger being connected to said rearward pin; and a leader eye disposed between said halves and projecting forwardly from said head above said spoon, said leader eye being connected to said forward pin.

7. In a fish lure member, the combination of: a body having forward and rearward ends; a rearwardly tapering head on the forward end of said body; a downwardly and forwardly extending spoon on said head; and two dive planes respectively extending laterally in opposite directions from said head and said body and extending upwardly and rearwardly from a forward position on the lower surface of the lure member adjacent the junction of said spoon and said head to a rearward position on the upper surface of the lure member rearwardly of the junction of said head and said body.

8. In a fish lure member, the combination of: a body having forward and rearward ends; a rearwardly tapering head on the forward end of said body; and two dive planes respectively extending laterally in opposite directions from said head and said body and extending upwardly and rearwardly from a forward position adjacent the lower surface of the lure member to a rearward position adjacent the upper surface of the lure member, the rearward taper of said head exposing said dive planes to the flow of water past said lure member resulting from relative movement of the lure member and the water.

9. A fish lure member as set forth in claim 8 including a downwardly and forwardly extending spoon on said head.

References Cited in the file of this patent

UNITED STATES PATENTS

| | | |
|---|---|---|
| 810,017 | Ackerman | Jan. 16, 1906 |
| 841,429 | Passage | Jan. 15, 1907 |
| 1,131,909 | Clarkson | Mar. 16, 1915 |
| 2,102,492 | Stolley | Dec. 14, 1937 |
| 2,241,767 | Cullerton | May 13, 1941 |
| 2,752,721 | Denny | July 3, 1956 |